United States Patent [19]

Dambroth

[11] 4,306,407

[45] Dec. 22, 1981

[54] LAWN CARE DEVICE

[75] Inventor: Jürgen Dambroth, Barsinghausen, Fed. Rep. of Germany

[73] Assignee: Firma RUX KG, Barsinghausen, Fed. Rep. of Germany

[21] Appl. No.: 970,681

[22] Filed: Dec. 18, 1978

[30] Foreign Application Priority Data

Dec. 24, 1977 [DE] Fed. Rep. of Germany ....... 2757963
Feb. 6, 1978 [DE] Fed. Rep. of Germany ... 7803395[U]

[51] Int. Cl.³ ...................... A01D 43/02; A01B 45/02; A01D 35/26
[52] U.S. Cl. ......................................... 56/193; 56/295; 56/255; 172/438; 172/748
[58] Field of Search ....................... 56/295, 16.6, 17.5, 56/193, 367, 400.04, 255; 172/45, 42

[56] References Cited

U.S. PATENT DOCUMENTS

| | | | |
|---|---|---|---|
| 2,720,071 | 10/1955 | Watanabe | 56/16.6 |
| 2,740,249 | 4/1956 | Stearns | 56/295 |
| 2,869,311 | 1/1959 | Beeston, Jr. | 56/295 |
| 3,086,346 | 4/1963 | Zimmermann | 56/17.1 |
| 3,117,633 | 1/1964 | Hosek | 172/42 |
| 3,321,026 | 5/1967 | Hubbard | 172/45 |
| 3,742,688 | 7/1973 | Tonjes | 56/295 |
| 3,964,243 | 6/1976 | Knipe | 56/295 |

Primary Examiner—Robert A. Hafer
Attorney, Agent, or Firm—Allison C. Collard; Thomas M. Galgano

[57] ABSTRACT

A lawn care device is provided which essentially consists of support beams or rotary cutter blades which are mounted onto the vertically disposed drive shaft of conventional lawn motors. The support beams are provided with receiving means, support-like bars, trunnions and the like, for pivotably mounting work tools thereon. The work tools are moved into an operating position by the forces resulting from the rotation of the support beam and are pivoted to a non-operative position when engaging an obstacle.

11 Claims, 13 Drawing Figures

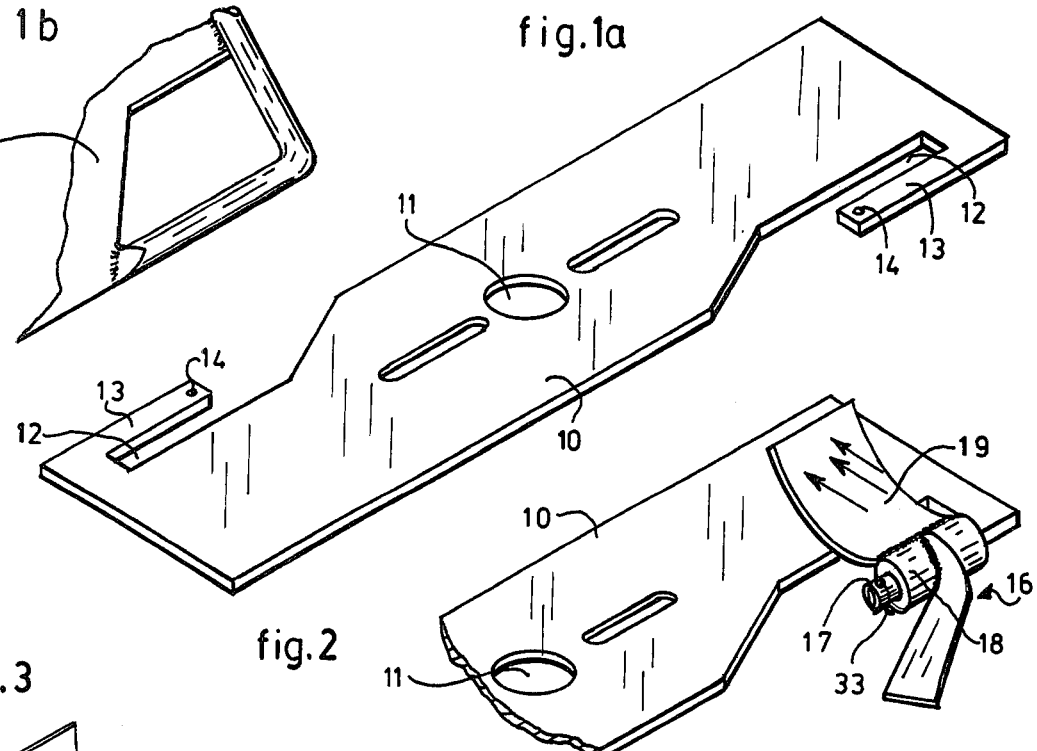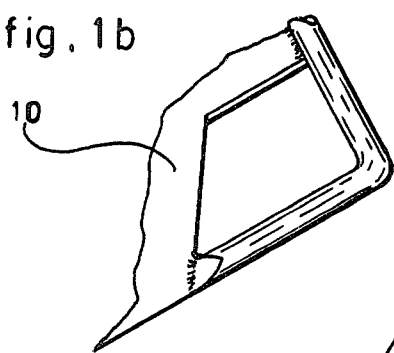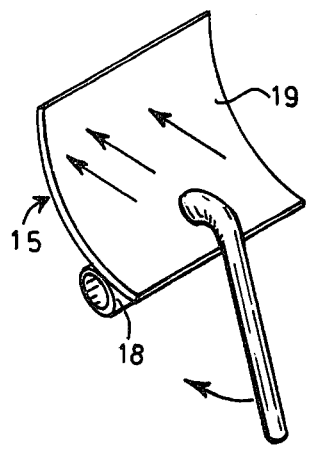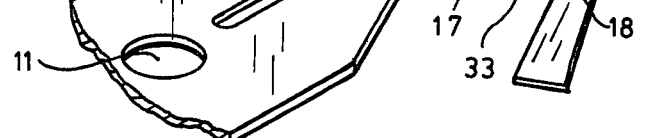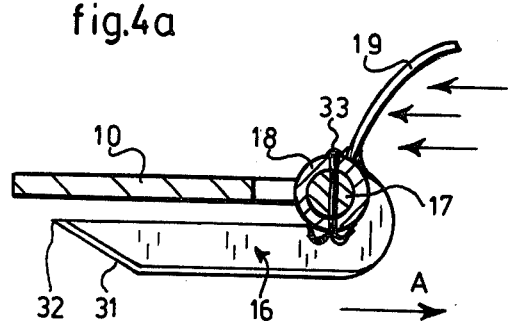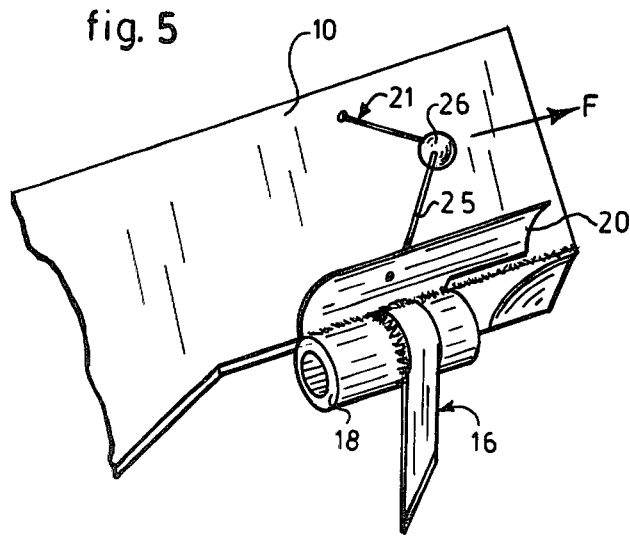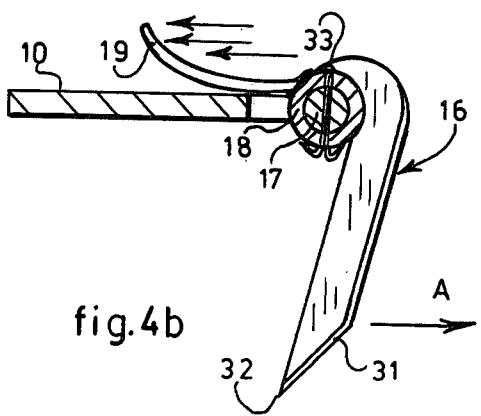

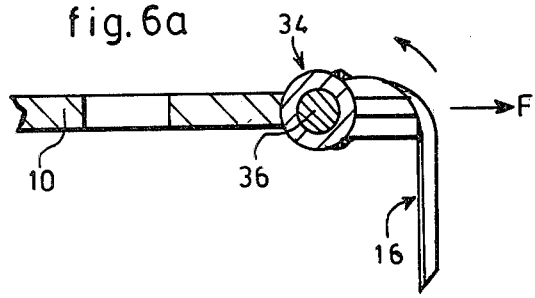
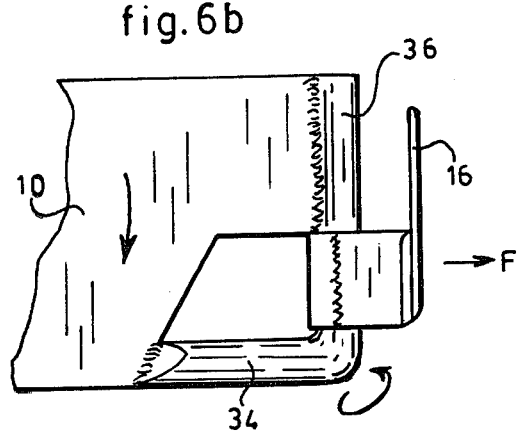
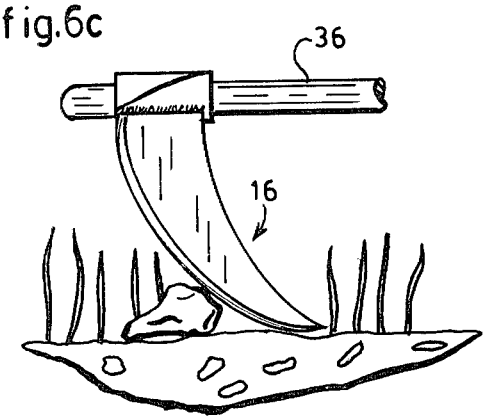
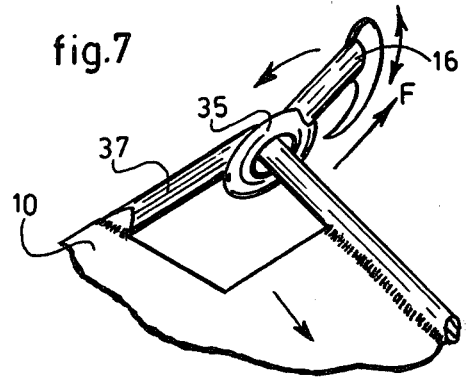
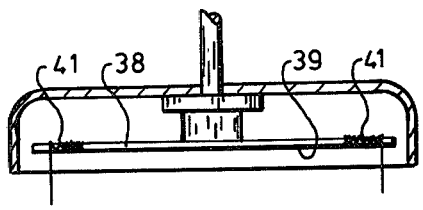
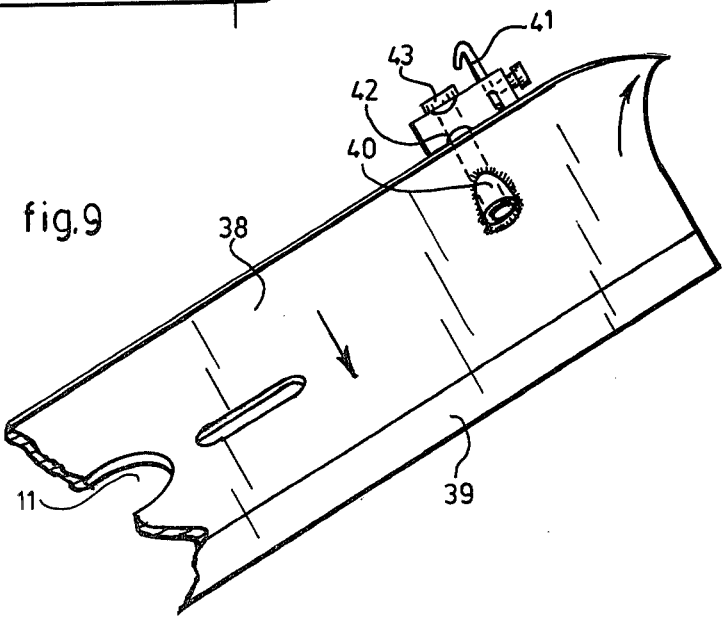

LAWN CARE DEVICE

The invention relates to a device for lawn care and the like. More particularly, it relates to a lawn mower attachment which essentially consists of a rotatable support beam, cutter support beam, or cutting blade which is mounted onto a vertically-disposed motor drive shaft of conventional lawn mowers and which is provided with receiving means for attaching work tools thereto.

Lawns require intensive care if they are to look healthy and beautiful. In particular, in addition to mowing the lawn, the zone close to the ground between the grass tips and the ground must be kept free from deposits, undesirable plants, moss, etc. Furthermore, the earth crust must be frequently scratched or cut, so that the supply of nutrients to the grass roots is assured.

Heretofore, these types of lawn care techniques are done by means of rakes, lawn brooms, manual scratching devices, and the like, in the case of small and medium lawns. Auxiliary devices for conventional lawn mowers are already known which facilitate the aforementioned operations by mechanical means. For example, so-called power rakes are suggested which can be mounted onto the lawn mower instead of the cutting blade or cutter beam supports. The power rakes are so arranged that the ends of a sheet metal member are deflected downwardly, thus forming the cutting edges which either engage between the grass blades for clearing purposes or for scratching the ground surface crust. These embodiments of power rakes are dangerous and frequently result in accidents or damage to the drive unit of the lawn mower, because the power rakes cannot circumvent obstacles on the ground, for example, stones. Therefore, it has been suggested to use flexible, deflected sheet metal members for the power rakes for treating the lawn which are in the shape of spring trunnions mounted on the support. These spring trunnions have a circular cross section and are suitable for aerating the area close to the ground, but are not suitable for cutting into the ground surface. Since the spring trunnions are more elastic than the aforementioned rigid sheet metal members having deflected ends, it is easier to avoid obstacles on the ground, so that damage to the drive unit is prevented but, on the other hand, they are still relatively rigid, so that they may interfere with its operation. Furthermore, these known power rakes are only suitable for clearing the ground.

To overcome the aforementioned disadvantages of the known devices, it is an object of the subject invention to provide a device for treating lawns by means of safety lawn mowers, or the like, wherein the immediate operating tool is protected from damage caused by obstacles present on the lawn.

Furthermore, it is an object of the present invention to provide such a device which may be easily adjusted to perform different operating tasks.

It is therefore an object of the invention to provide a lawn attachment device wherein the operating tools are mounted on receiving support-like plates, trunnions or the like, of the cutter support beam or blade and wherein they are moved to an operating position by the centrifugal forces resulting from the rotation of the cutter blade support beam or cutter support beam, and are pivoted to a non-operating position when they engage an obstacle.

In one embodiment of the invention, impellers are mounted on the operating tools which pivot the operating tools into operating position when the air is pushed against the impeller during the rotation of the support beam. It is essential to shape the impeller in such a way that they act to throw out the raked or grass cuttings from the lawn. Thereby, the pressure on the impeller is increased and the operating position of the operating tool is additionally stabilized.

The pivoting of the operating tools into the operating position may also be accomplished due to centrifugal forces which are generated by the rotation of the support beam. These centrifugal forces may be advantageously put to use by the employment of special centrifugal devices, for example, centrifugal weights which are, on the one hand, coupled with the support beam and, on the other hand, with the operating tools by means of ropes, chains, levers, or the like. Alternatively, the operating tools themselves may be centrifugally weighted and mounted in an axially displaceable manner on the trunnion and slide on a screw-like guide on a worm drive and the trunnion. Alternately, worm-like connections are provided in the worm drive and the trunnion which come into engagement with each other during the outward movement due to the centrifugal force. Naturally, the pressure forces which act on the tool impellers and the centrifugal forces may be used in combination.

Furthermore, the centrifugal devices which act directly on the operating tools may be used in such a way that the operating tools are suspended swingingly from the support beam on trunnions or eyelets. Thereby, it has been shown to be advantageous to arrange the operating tools in such a manner that their respective centers of gravity are positioned below the pivot or mounting axis of the operating tools on the trunnions or eyelets. The operating tools are either lawn aerating devices, that is, power rakes or scratching and cutting devices for the ground surface, or may have any other desirable shapes for lawn care devices.

It is advantageous that the scratching devices be provided with cutting edges and also cutting tips. The cutting edges may have a saw tooth shape, or may have a sickle like curvature, for example. When using the support beam for the cutters as a cutting blade for cutting lawn, the receiving elements of one or a plurality of additional operating tools should be mounted behind the cutter or cutters of the cutter beams. The additional operating tools may essentially be spring pins which act as power rakes or cutting knives and which are mounted on the centrifugal guide pieces or weights which are mounted on the support beam.

Other objects and features of the present invention will become apparent from the following detailed description when taken in connection with the accompanying drawings which disclose several embodiments of the invention. It is to be understood that the drawings are designed for the purpose of illustration only, and are not intended as a definition of the limits and scope of the invention.

In the drawings:

FIG. 1a is a perspective view of a support beam embodying the present invention having plate-like flanges for receiving the operating devices or tools;

FIG. 1b is a fragmentarily-illustrated plan view of an alternate embodiment of the support beam which is provided with an eyelet for attaching the operating tools;

FIG. 2 is a fragmentarily-illustrated perspective view of a further embodiment of the support beam having a trunnion-like flange with an operating tool supported thereon.

FIG. 3 is a perspective view of another embodiment of an operating tool;

FIG. 4a is a side sectional view of a support beam with an operating tool in an non-operative position;

FIG. 4b is a side sectional view similar to that of FIG. 4a, but showing the tool in an operative position;

FIG. 5 is a perspective view of one embodiment of a centrifugal guide of the operating tool with an associated centrifugal weight mounted on the cutter beam;

FIG. 6a is a side sectional view of the support beam with another embodiment of a centrifugal force guide coupled to a swinging operating tool and suspended from a support beam trunnion;

FIG. 6b is a top plan view of FIG. 6a;

FIG. 6c is an elevational end view of FIG. 6a, further showing the lawn surface relative thereto;

FIG. 7 is a fragmentarily-illustrated perspective view of a support beam having an eyelet;

FIG. 8 is a side sectional view of, in part elevation of, the lower part of the lawn mower; and FIG. 9 is a fragmentarily-illustrated perspective view of a further embodiment of the inventive device.

Referring now to FIG. 1a, a support beam 10 made in accordance with the present invention, is provided which is symmetric and consists of a practically oscillation-free steel or plastic element of about 3 to 6 mm thickness. Support beam 10 is provided with a central bore 11, two longitudinal bores and, adjacent to opposite longitudinal ends thereof, flange extensions 13 each of which, along with an adjacent portion of the support member 10, define a portion of a slot 12. Over these plates 13, which may also be in the form of trunnions 17 (see FIG. 2), operating devices or work tools 15 and 16 (see FIG. 3) are selectively mounted depending on the operation to be performed and, as can be seen in FIG. 2, tools 16 are secured thereon by means of cotter or split pins 33 which are inserted in bores 14.

Operating tools 15, 16, shown in FIGS. 2-4b, are provided with impellers 19 with which the operating tools are pivoted into the operating position (shown in FIG. 4b) when supporting beam 10 is rotated. The direction of the wind pressure generated by the rotation of support beam 10 is indicated by arrows in front of impellers 19. As shown in FIGS. 4a and 4b, when cutting knife or tool 16, moving in the direction indicated by arrow A, hits an obstacle with its tip 32 or cutting edge 31, tool 16 can circumvent the obstacle by moving into an inoperative position as shown in FIG. 4a, for example, in that it pivots with its associated bushing 18 around trunnion 17. When the obstacle is passed by tool 16, the air again presses against the impeller of cutting tool 16 causing it to return to its operative position, as shown in FIG. 4b.

FIGS. 5-8 show examples of how the operating tools or devices are moved into the operative position due to the centrifugal forces generated by the rotation of support beam 10 (the centrifugal forces being indicated in the Figures by arrows F). In FIG. 5 a centrifugal force guidance device 21 is provided which includes a rope or chain 25 which is connected to support beam 10 and operating tool 16. Rope 25 supports a centrifugal weight 26 which pulls in direction F due to the centrifugal force and thereby pivots the operating device 16 into the operating position shown in FIG. 5. When the cutting edge of operating tool or knife 16 engages an obstacle, the knife yields rearwardly by overcoming the centrifugal force. When the obstacle is passed, the centrifugal force pulls the operating tool back into the operating position by means of the shown mechanism. In this embodiment the aerodynamic or wind force acts on an impeller 20 in a manner previously explained. Impeller 20 of FIG. 5 also acts as a throw out device for the material raked or cut off from the lawn.

The centrifugal force guide device 34 in accordance with FIGS. 6a, 6b, 6c, shows that the support for the operating tool 16 is a trunnion 35. Tool 16 is rotated by about 90° around trunnion 35 during movement thereof. Due to the specific weight distribution of the operating tool or device with a center of gravity below the pivot axis, the operating tool is pivoted into the shown operating position by means of the centrifugal force F when support beam 10 is rotated. When engaging obstacles, as indicated in FIG. 6c, the operating tool cutting blade is deflected laterally. This deflection is favored by the wide curved cutting blade as seen best in FIG. 6c. When the obstacle is passed, the tool is again pivoted into the normal position as shown in FIGS. 6a and 6b.

The centrifugal force guide device 35 in accordance with FIG. 7 shows an operating tool 16 which is held in a support eyelet 37 on support beam 10. FIG. 7 shows that tool 16 swings freely to the outside due to the centrifugal force F. When treating the lawn, operating tool 16 is pivoted rearwardly due to the grass resistance. In this embodiment, operating tool 16 has a greater ability to circumvent obstacles in a plurality of planes. As can be seen from FIG. 8, a support cutter or beam 38 is mounted on the lower part, that is, on the rotor or drive shaft 20 of a lawn mower motor with cutting blade portion 39 at its front edges and additional operating tools or devices, for example, power rakes 41 at its rear ends. With such a device the lawn can be simultaneously cut and aerated.

The mounting of the additional operating tools on the cutter beam 38 having a cutting blade portion 39 is shown in FIG. 9. FIG. 9 shows a cutter beam with an arched throw-out edge. For attaching the additional operating tool, which in this case is a power rake 41, it can be seen that a screw socket 40 is welded to cutter beam 38. A support device 43 in the form of a screw is screwed into screw socket 40 for the power rake which in this embodiment is a spring pin 41 which is supported by a centrifugal force guide piece 42. In the rest position the free ends of this rectangular centrifugal force guide piece depend downwardly due to its larger weight, whereby spring pin 41 is positioned parallel to the inside of cutter support beam 38. Due to the centrifugal force generated upon rotation of beam 38, the free end of the centrifugal force guide piece 42 is forced outwardly, whereby the spring pin 41 is pointed downward into the operating position toward the lawn.

The scope of the invention is naturally not limited to the described examples, but extends to all possible embodiments of operating devices with wind or centrifugal devices on cutter support beams or support beams in safety mowers.

Thus, while only several embodiments of the present invention have been shown and described, it will be obvious to those persons of ordinary skill in the art, that many changes and modifications may be made thereunto without departing from the spirit and scope of the invention.

What is claimed is:

1. A device for lawn care for use in connection with a lawn mower having a vertically-extending motor drive shaft, comprising:

at least one generally horizontally-disposed support beam having a vertical axis of rotation which may be coupled to said shaft for rotation therewith, said support beam including mounting means for pivotably mounting work tools thereon so that said work tools may be pivoted between an operative position, which position of the tool is caused by the centrifugal forces resulting from the rotation of said support beam, and a non-operative position, which position of the tool is caused by the tool engaging an obstruction;

at least one working tool pivotably mounted on said support beam by means of said mounting means, said tool being pivotably mounted such that movement thereof from said operative to said non-operative position occurs in a direction generally opposite to the rotational direction of said support beam and so that upon engaging an obstacle said tool yields rearwardly relative to the rotating support beam by overcoming the centrifugal force acting thereon and upon passing the obstacle is returned to said operative position by the centrifugal force acting thereon; and a centrifugal force guidance device coupled to said tool for effecting pivotable movement of said tool to said operative position thereof upon rotation of said support beam, said centrifugal force guidance device comprising a centrifugal weight which is coupled between said support beam and said tool by connecting means and which, upon rotation of said support beam, is movable radially outwardly from the axis of rotation of said support beam toward an end of said support beam under the influence of the centrifugal force acting thereon so as to urge said tool into said operative position thereof.

2. The device according to claim 1, wherein said at least one working tool has an impeller portion which effects pivotal movement thereof into said operative position.

3. The device according to claim 2, wherein said impeller has a surface configured to propel in a radially outward direction material removed from the lawn surface.

4. The device according to claim 1, wherein said connecting means comprises ropes.

5. The device according to claim 1, wherein said connecting means comprises chains.

6. The device according to claim 1, wherein said tool is a lawn aerating tool.

7. The device according to claim 1, wherein said tool is a lawn cutting knife.

8. The device according to claim 1, wherein said support beam is in the form of a rotary cutter support beam for cutting the lawn, having two arm portions each of which has a forward edge which serves as a cutting blade and wherein said mounting means for mounting at least one work tool is disposed rearwardly of said forward edges on said cutter support beam.

9. The device according to claim 1, comprising additional work tools shaped as spring pins which are mounted on centrifugal guide pieces pivotably mounted on support devices which, in turn, are mounted on said support beam.

10. The device according to claim 9 wherein said additional work tools are power rakes.

11. The device according to claim 9, wherein said additional work tools are cutting devices for the ground surface.

* * * * *